United States Patent
Rhode

(10) Patent No.: US 8,008,832 B2
(45) Date of Patent: Aug. 30, 2011

(54) ELECTRIC MOTOR AND METHOD FOR MANUFACTURING AN ELECTRIC MOTOR

(75) Inventor: Stephan Rhode, Karlsruhe (DE)

(73) Assignee: Sew-Eurodrive GmbH & Co. KG, Bruchsal (DE)

( * ) Notice: Subject to any disclaimer, the term of this patent is extended or adjusted under 35 U.S.C. 154(b) by 251 days.

(21) Appl. No.: 12/084,310

(22) PCT Filed: Oct. 24, 2006

(86) PCT No.: PCT/EP2006/010218
§ 371 (c)(1),
(2), (4) Date: Apr. 28, 2008

(87) PCT Pub. No.: WO2007/048567
PCT Pub. Date: May 3, 2007

(65) Prior Publication Data
US 2009/0134742 A1    May 28, 2009

(30) Foreign Application Priority Data
Oct. 26, 2005 (DE) .......... 10 2005 051 506

(51) Int. Cl.
*H02K 1/06* (2006.01)
(52) U.S. Cl. .............................. 310/216.058
(58) Field of Classification Search ........ 310/216.058, 310/216.079, 216.086, 216.088, 216.105, 310/216.015
See application file for complete search history.

(56) References Cited

U.S. PATENT DOCUMENTS

| | | | |
|---|---|---|---|
| 4,999,532 A | 3/1991 | Bartell | |
| 6,127,760 A * | 10/2000 | Nagasaki et al. | 310/216.074 |
| 6,226,856 B1 * | 5/2001 | Kazama et al. | 29/596 |
| 6,359,355 B1 | 3/2002 | Hartsfield et al. | |
| 6,400,059 B1 * | 6/2002 | Hsu | 310/254.1 |
| 6,448,686 B1 * | 9/2002 | Dawson et al. | 310/216.051 |
| 6,688,904 B1 * | 2/2004 | Schnalzger et al. | 439/404 |
| 7,408,282 B2 * | 8/2008 | Stewart | 310/216.132 |
| 7,615,907 B2 * | 11/2009 | Fei et al. | 310/216.074 |
| 2004/0068857 A1 | 4/2004 | Park et al. | |
| 2004/0189137 A1 | 9/2004 | Hashimoto et al. | |

FOREIGN PATENT DOCUMENTS

| | | |
|---|---|---|
| DE | 198 57 954 | 6/2000 |
| EP | 0 833 427 | 4/1998 |
| EP | 1 322 021 | 6/2003 |
| JP | 10-136621 | 5/1998 |
| JP | 11-341716 | 12/1999 |

OTHER PUBLICATIONS

International Search Report, PCT International Patent Application No. PCT/EP2006/010218, dated Jan. 19, 2007.
Translation of International Preliminary Report on Patentability, PCT International Patent Application No. PCT/EP2006/010218, dated Jun. 19, 2008.

* cited by examiner

*Primary Examiner* — Hanh N Nguyen
(74) *Attorney, Agent, or Firm* — Kenyon & Kenyon LLP

(57) ABSTRACT

An electric motor, includes a stator, which is composed at least of stamp-packed tooth segments, the tooth segments being able to be slid together radially in the manufacture and being able to be held together by retaining elements slid on axially.

16 Claims, 11 Drawing Sheets

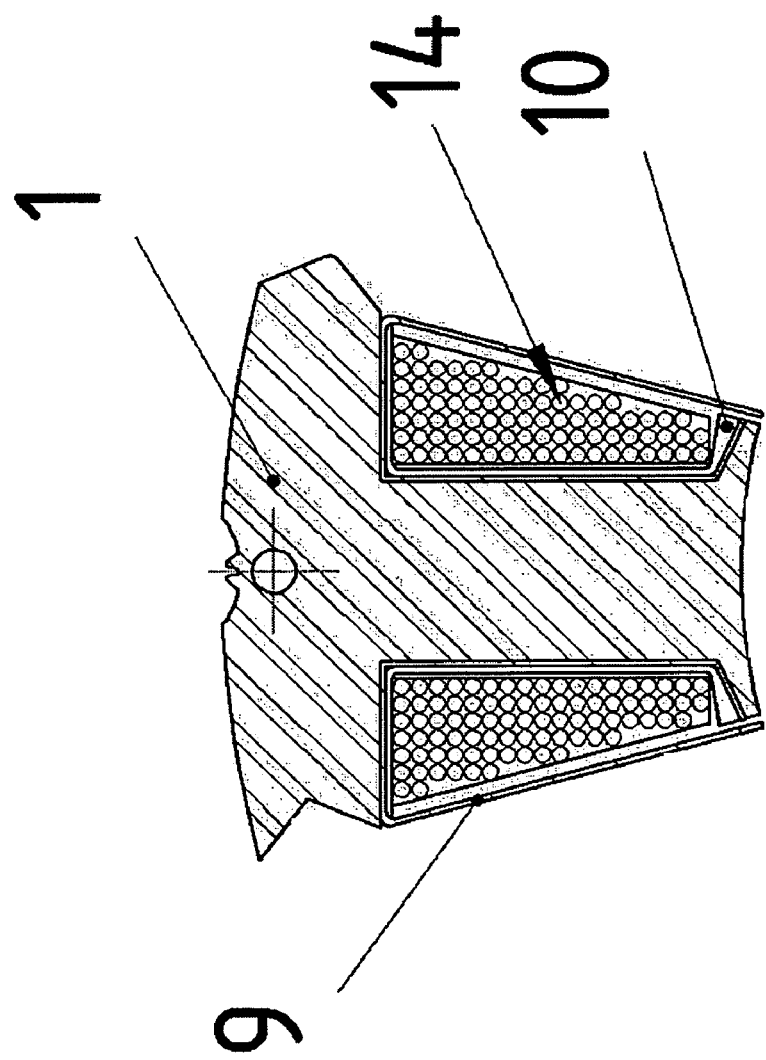

ELECTRIC MOTOR AND METHOD FOR MANUFACTURING AN ELECTRIC MOTOR

FIELD OF THE INVENTION

The present invention relates to an electric motor and a method for manufacturing an electric motor.

BACKGROUND INFORMATION

European Published Patent Application No. 1 322 021 describes a stator in which the teeth of the stator are axially inserted into a hollow cylindrical annular body. Caps, having electrical plug connections, are plugged onto both ends. The large mass and thus costly manufacture of the motor is a disadvantage.

U.S. Pat. No. 6,226,856 also describes a stator in which the teeth of the stator are inserted axially into one another.

U.S. Pat. No. 6,359,355 describes a stator in which the segments are indeed brought together radially, but they are retained by a surrounding "circular pattern 28".

SUMMARY

Example embodiments of the present invention provide a device and a method by which the manufacture of an electric motor and an associated series may be simplified and by which the protection of the environment may be improved.

According to example embodiments of the present invention, an electric motor includes a stator, which is at least composed of stamp-packed tooth segments, the tooth segments being able to be slid together radially in the manufacture and being able to be held together by holding elements slid on axially.

An advantage in this regard is that less mass is required for the stator pack, in particular no ring surrounding the tooth segments for retaining the tooth segments by shrink-fitting. Thus the protection of the environment is improved. Moreover, manufacturing is possible quickly and simply and in a highly automated and thus cost-effective fashion. In this regard, the segments are simply slid together radially and retaining elements are then plugged on axially.

It is furthermore advantageous that the stator pack may be inserted into various housing systems as a preassembled unit, which improves the flexibility and the modular system diversity. In this regard, it is only necessary to keep one stator pack in stock for multiple varying housing types of the electric motor as a whole.

The stator pack is also referred to as a stator for the sake of simplicity.

The retaining elements may be connected to the tooth segments in form-locking fashion. An advantage in this regard is that portions of the retaining force are producible by a simple supplementary part that may be plugged on axially.

The retaining elements may be inserted by pegs into holes of the tooth segments. In particular, the pegs are oriented in the axial direction. An advantage in this regard is that the retaining element is simple to manufacture and that a sufficiently high stability may be produced by simple connecting devices.

The tooth segments may have groove and tongue for form-locking interconnection in the circumferential direction. An advantage in this regard is that a form-lock may be produced in the circumferential direction by simply shaping the tooth segments. Because of the pegs of the retaining elements, the tooth segments would theoretically only be able to rotate around the pegs. However, since the groove and the tongue are designed such that they are insertible into each other in the circumferential direction, a radial motion is prevented. The results from the fact that the groove-tongue form-lock is situated on both sides in the circumferential direction.

The retaining elements may include electrical connections for producing the interconnection of the windings of the individual tooth segments. In particular, the retaining elements have a stamped grid extrusion-coated with plastic. An advantage in this regard is that the wiring, that is, the production of the series or parallel connection, may be executed particularly quickly and simply. The retaining element may also be designed to have plug contacts for establishing electrical plug connections to electric lines. In this instance, the tongues of the plug contacts are parts of the bent stamped grid, that is, of a stamped-bent grid instead of a stamped grid.

Each tooth segment may have an axially slid-on end cap, in particular including grooves for running wires. An advantage in this regard is that the form of the winding may be influenced better and thus a high degree of copper filling may be produced. This yields a high utilization of the motor while minimizing losses of the motor.

Among features in the method for manufacturing an electric motor are that in the manufacture the tooth segments are radially slid together and subsequently are axially slid on by retaining elements, in particular for holding together the segments.

An advantage in this regard is a very quick and simple manufacture. The manufacture is thus also cost-effective.

LIST OF REFERENCE CHARACTERS

1 tooth segment, stamp-packed
2 hole
3 tongue
4 groove
5 retaining element
6 peg
7 stator, complete
8 projection
9 insulating paper
10 end cap
11 coil support
12 grooves
13 wire guide
14 winding Example embodiments of the present invention will now be explained in greater detail with the aid of figures.

BRIEF DESCRIPTION OF THE DRAWINGS

FIGS. 4 through 11 show the manufacturing steps of the fully wound tooth segment in order.

DETAILED DESCRIPTION

The motor according to example embodiments of the present invention includes a stator made up at least of tooth segments.

FIGS. 4 through 11 show the manufacturing steps of the fully wound tooth segment in order.

Figure 1:
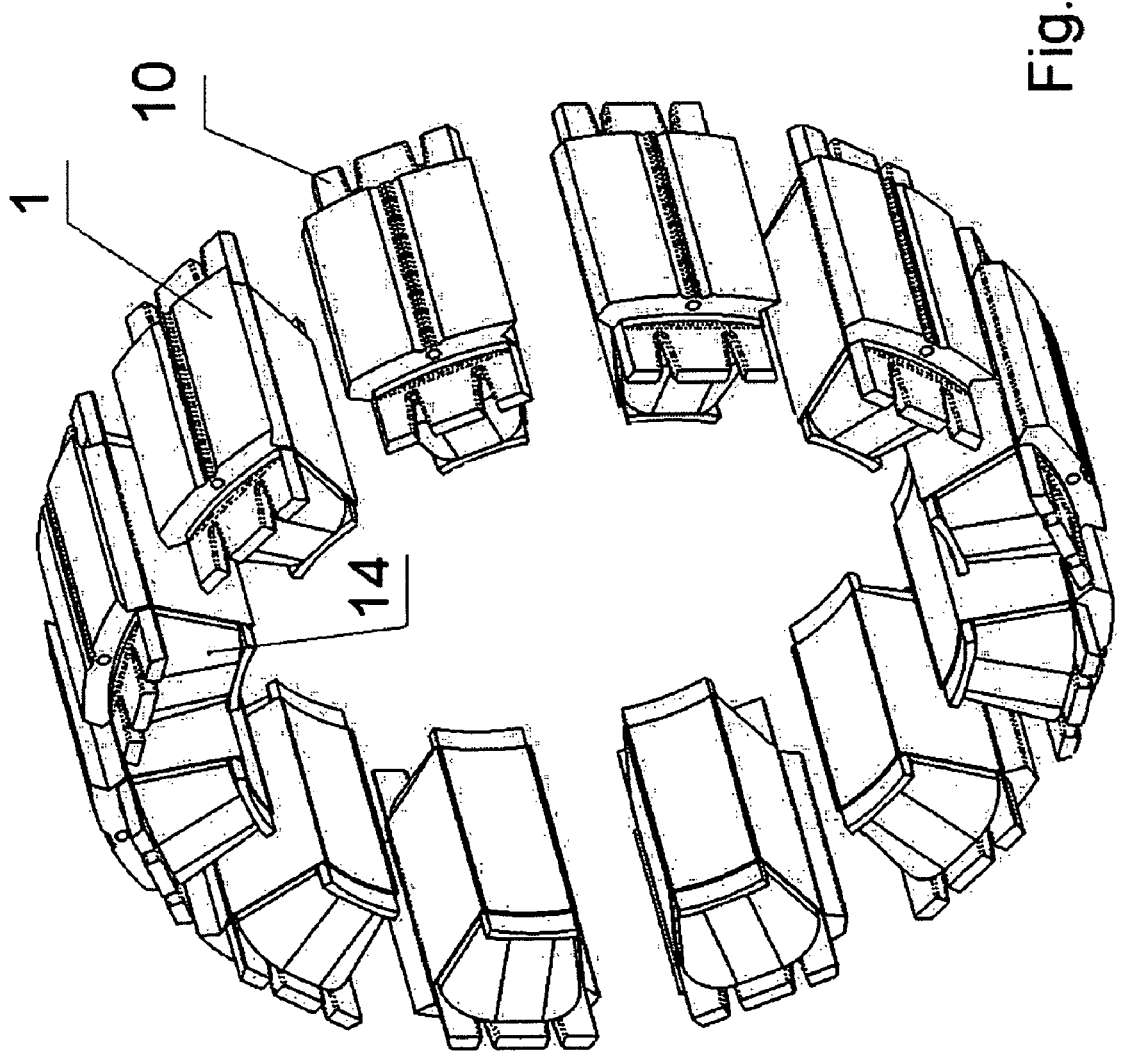
FIGS. 1 through 3 show the assembly of the stator from the tooth segments.
Figure 2:
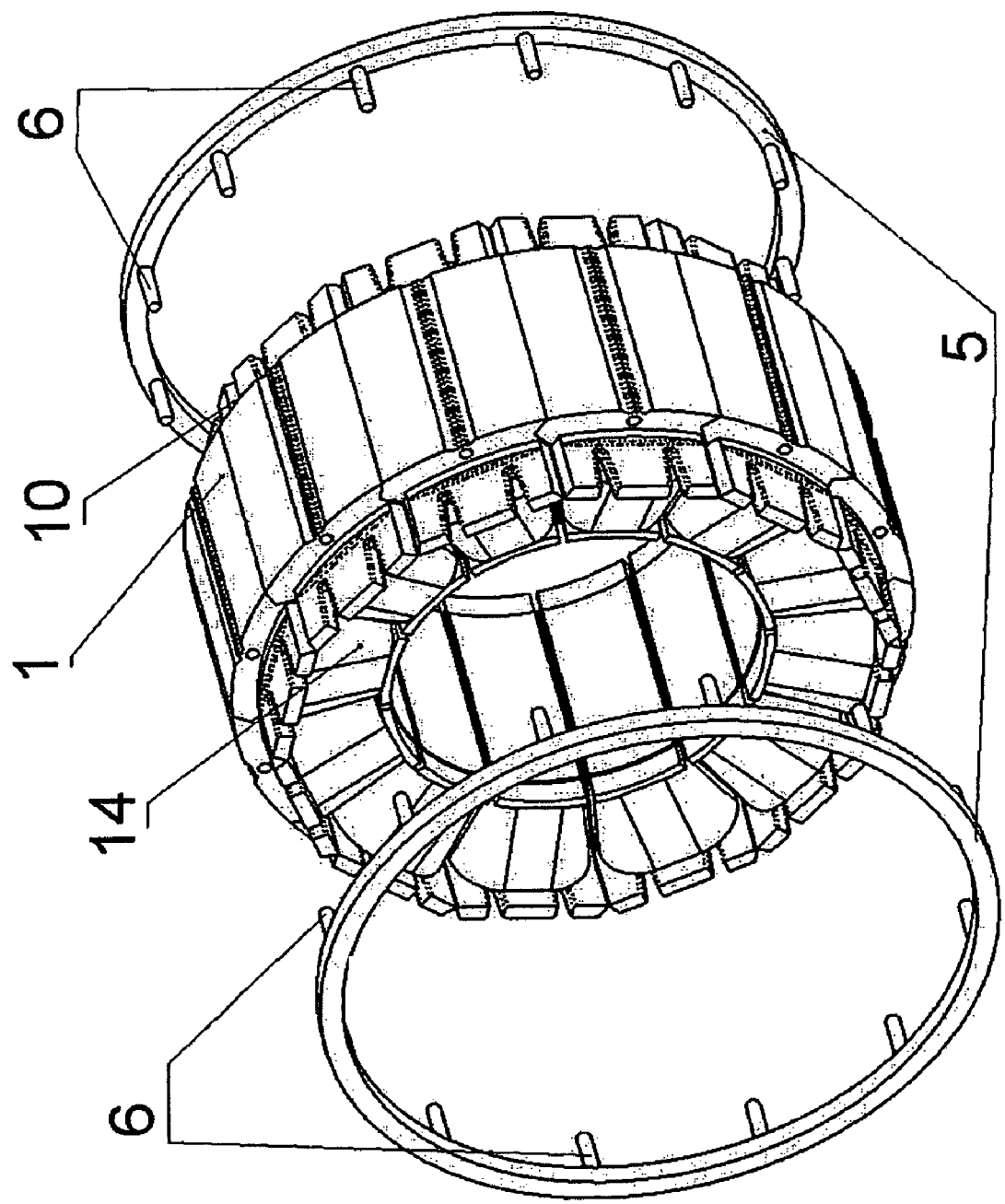
Figure 3:
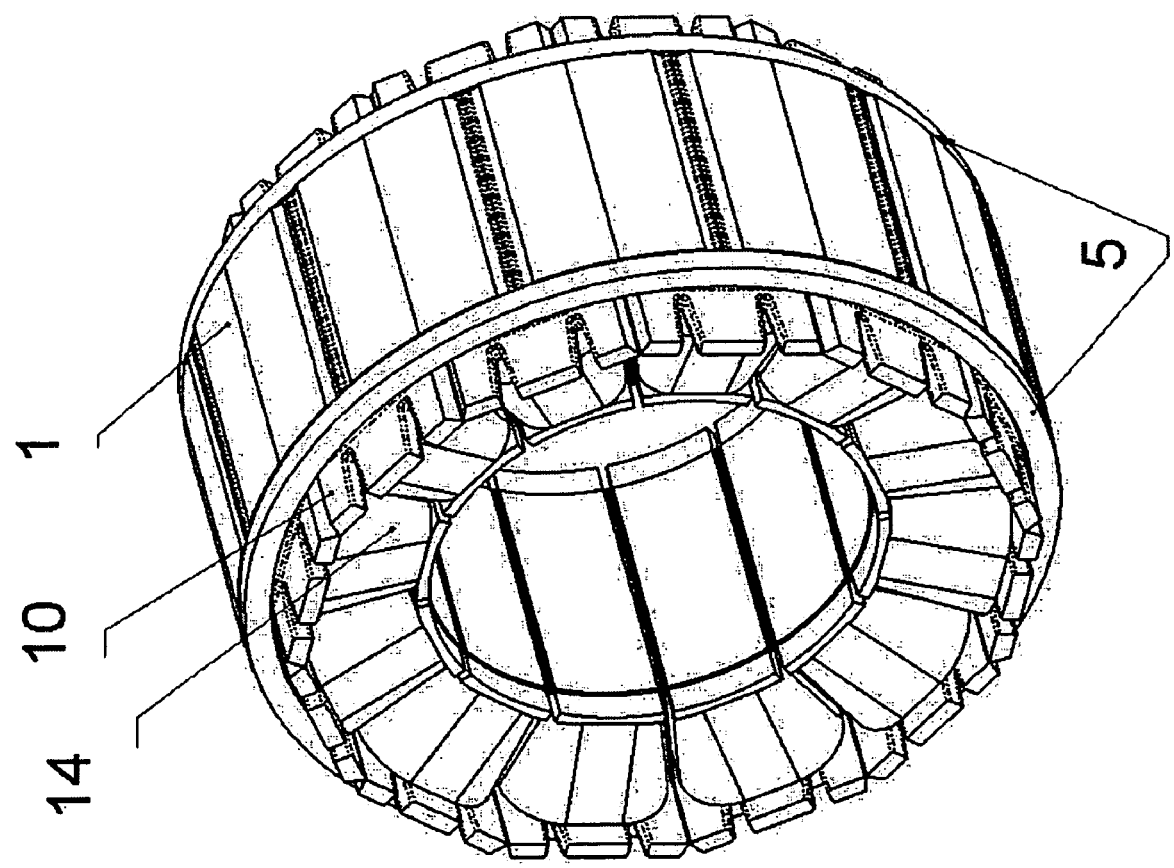

FIGS. 1 through 3 show the assembly of the stator from the tooth segments.

In the following, the figures are explained in more detail in sequence.

Figure 4:
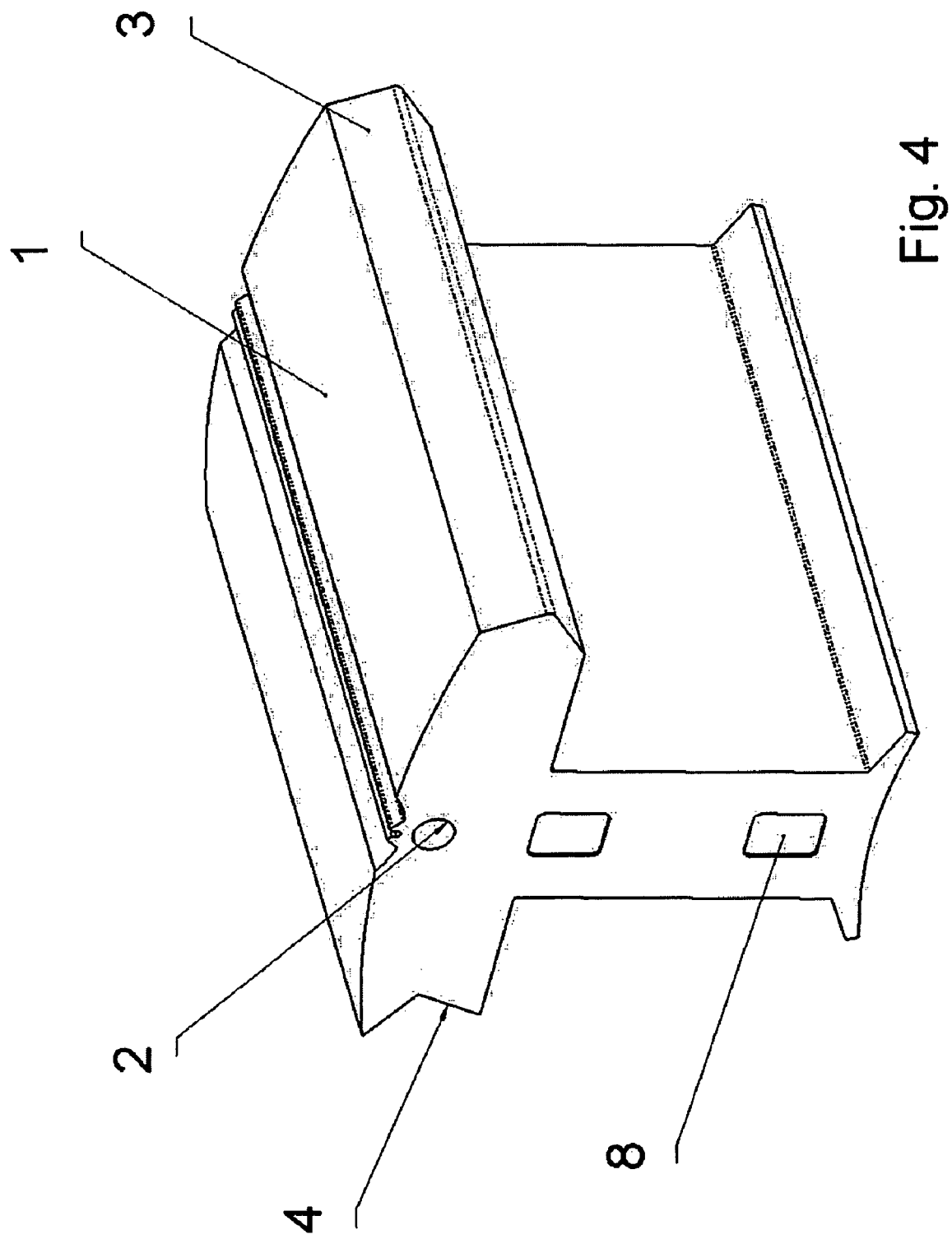

FIG. 4 shows a tooth segment 1. It has a groove 4 and a tongue 3 and a projection 8 produced by the stamp-packing process. In addition, a hole is provided for inserting pegs 6.

Figure 5:
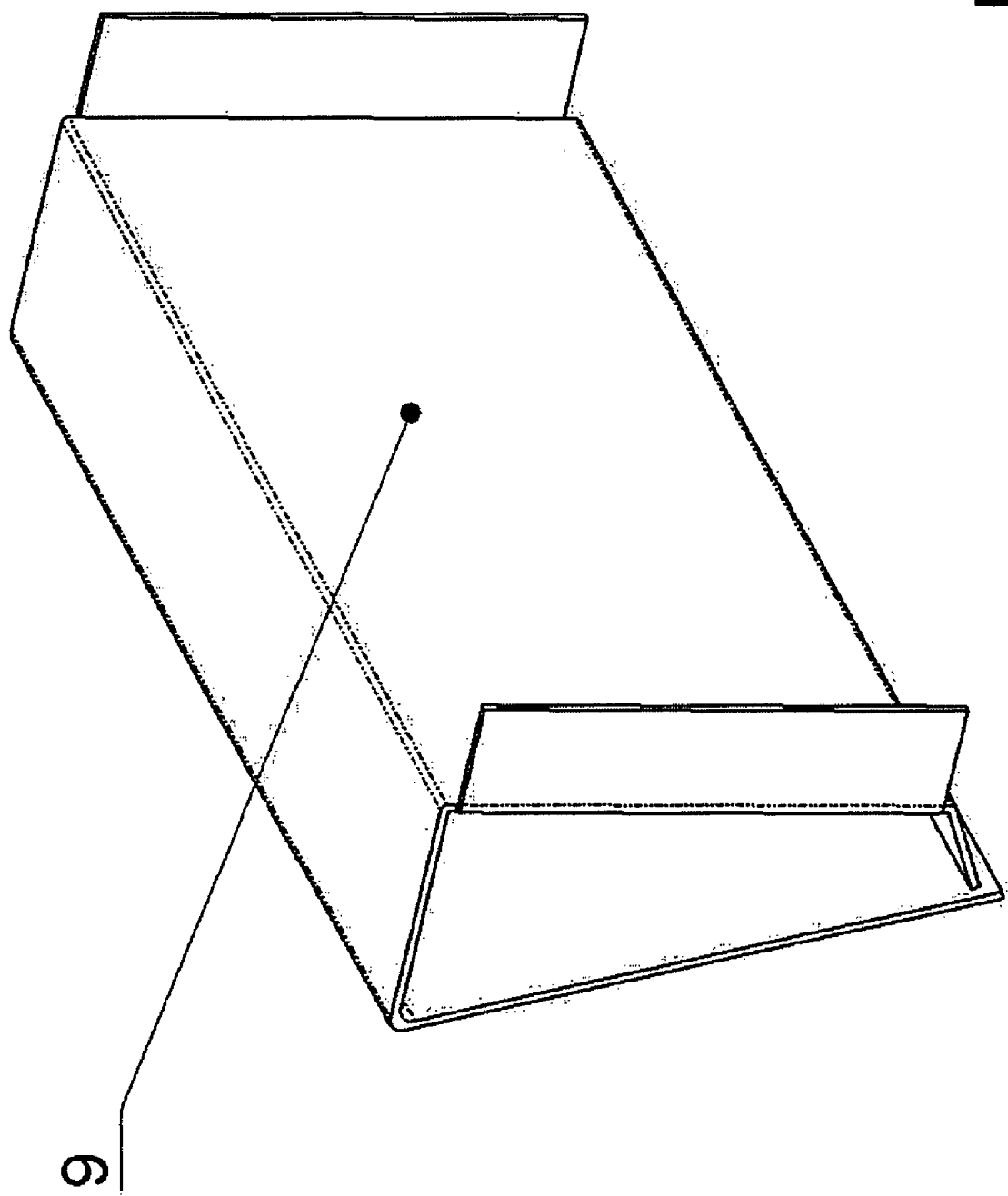

FIG. 5 show the insulating paper 9 that is slid onto the tooth segment.

Figure 6:
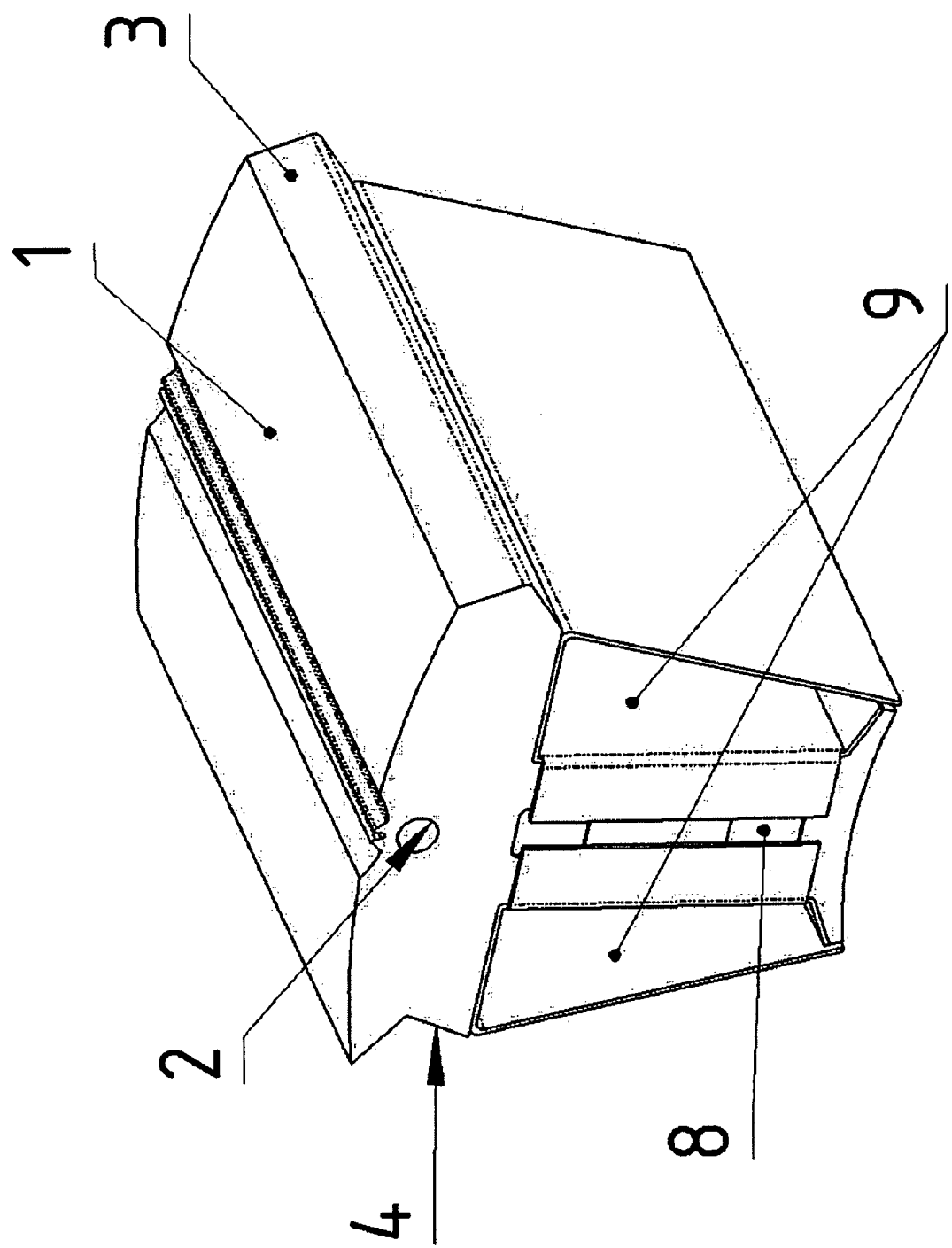

FIG. 6 shows tooth segment 1 having insulating paper 9 slid onto it.

Figure 7:
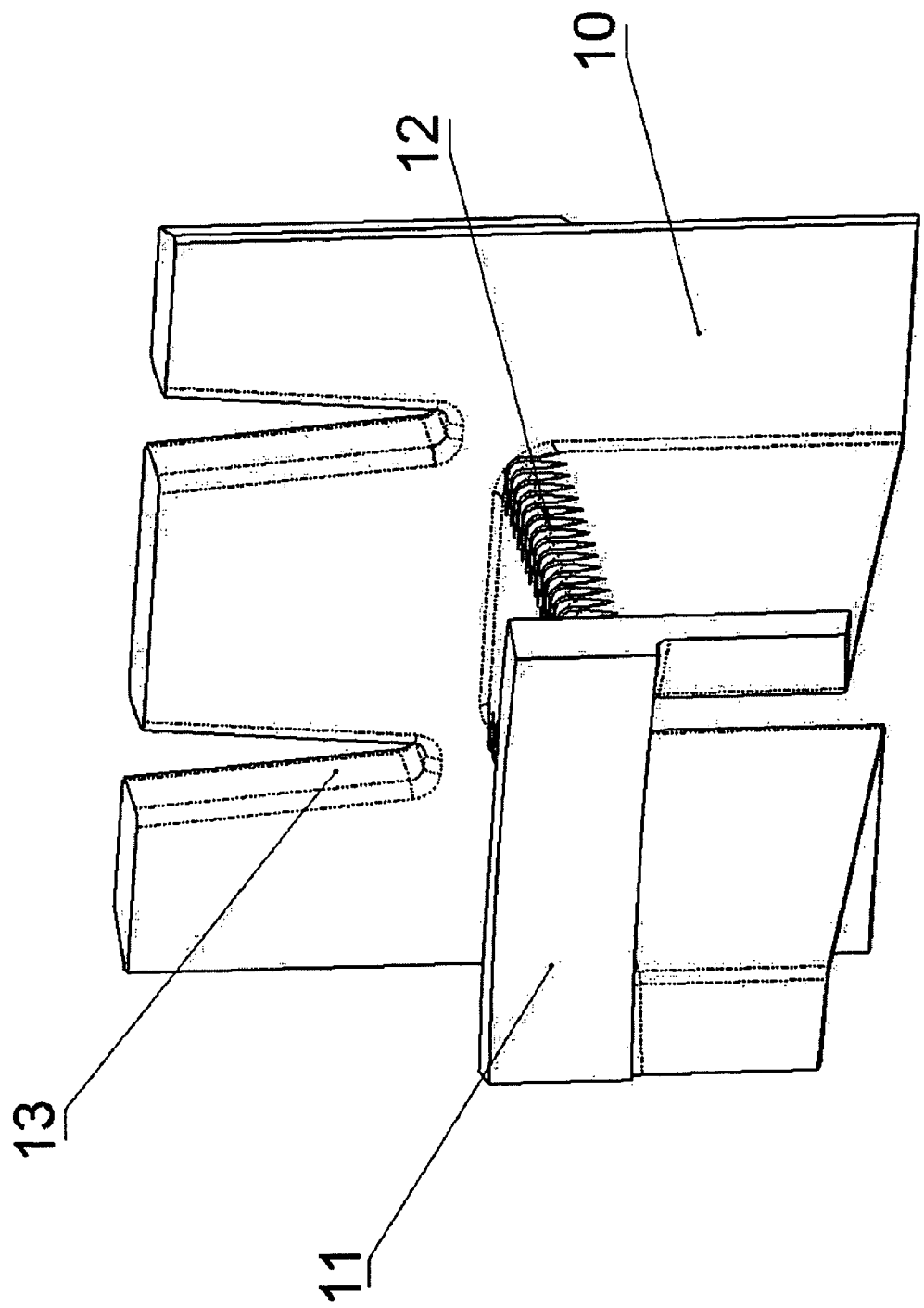

FIG. 7 shows an end cap 10, which has grooves 12 for guiding wires and a coil support 11 for securing the winding and recesses as wire guides 13.

Figure 8:
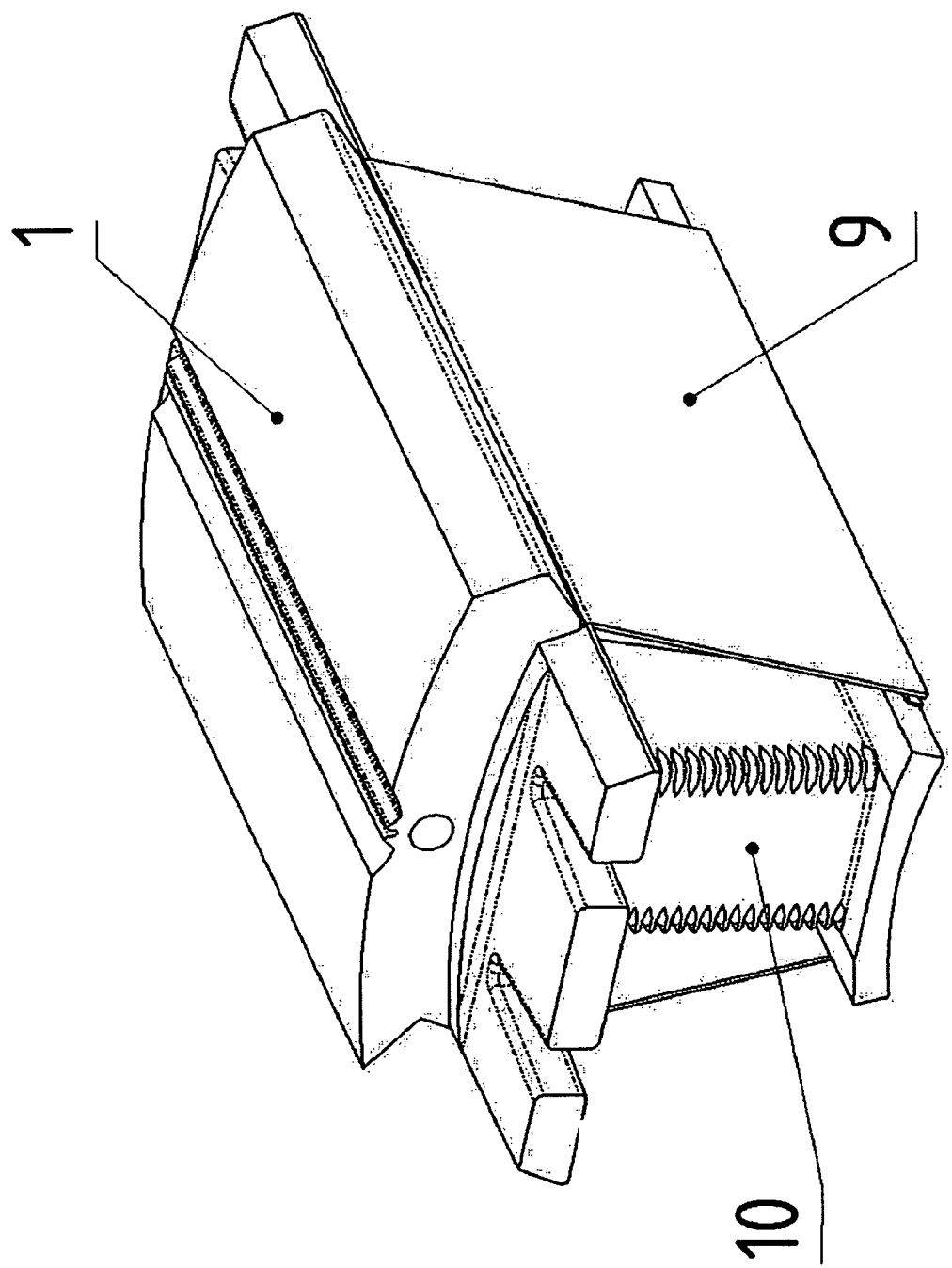

FIG. 8 shows a tooth segment having slid-on end caps 10.

Figure 9:
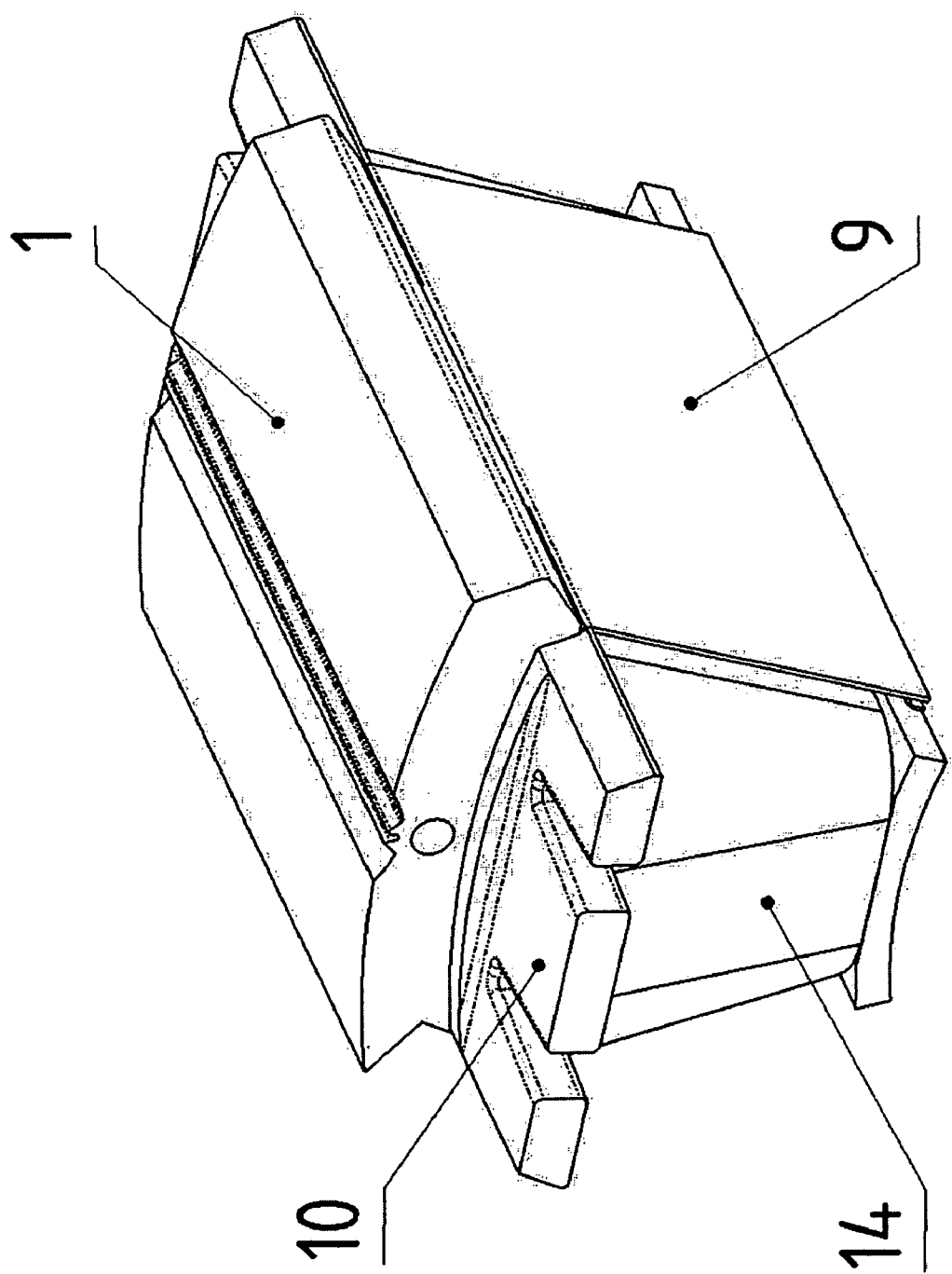

FIG. 9 shows a tooth segment subsequently wound by winding 14.

Figure 10:
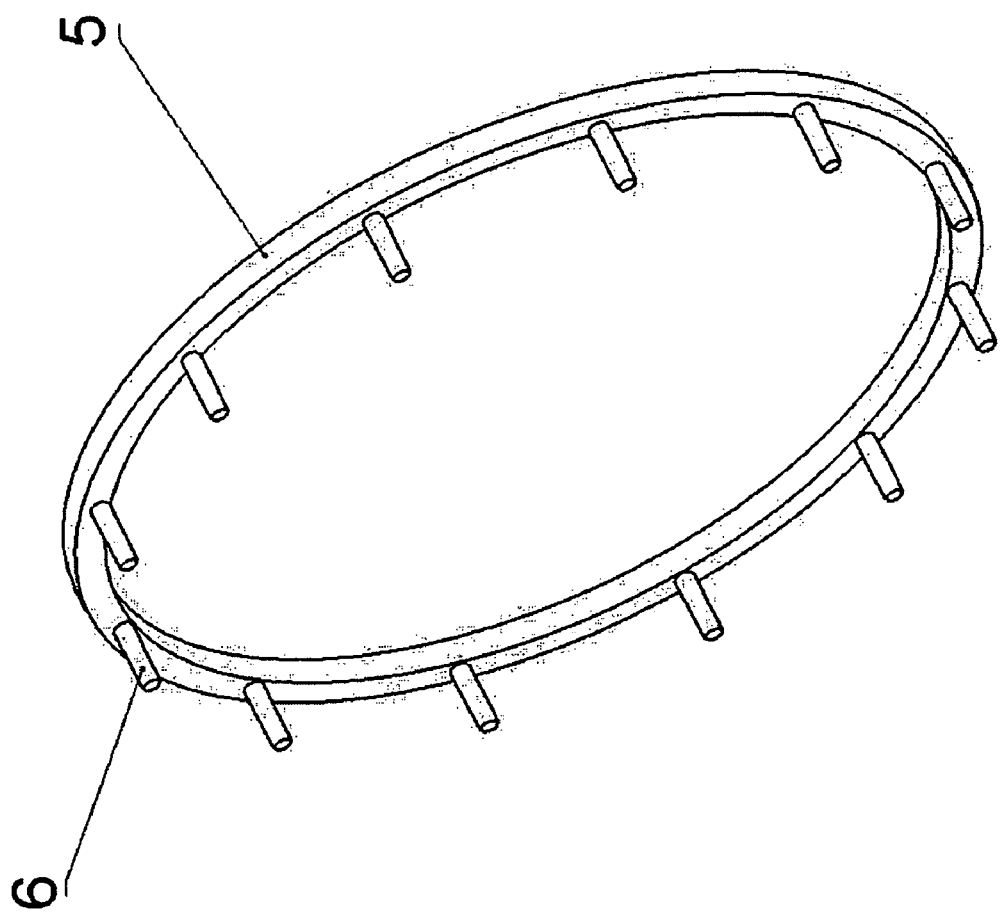

FIG. 10 shows retaining element 5 having pegs 6. Pegs 6 are shown protruding and oriented in the axial direction. Retaining element 5 may be made of plastic.

FIG. 11 is a cross-sectional view through fully wound tooth segment 1. Winding 14 is surrounded by insulating paper 9.

FIG. 1 shows stamp-packed, fully wound tooth segments 1, which are radially slid together when manufacturing the stator. In the process, the respective groove 4 and tongue 3 of adjacent tooth segments meet and thus secure the connection of the two respective tooth segments in the radial direction.

FIG. 2 shows how retaining elements 5 are slid on in the axial direction on the axial end regions and are connected by their pegs 6 in a form-locking manner to the tooth segments. For this purpose, pegs 6 are inserted into holes 2 of the tooth segments.

Thus, retaining elements 5 give the stator its cylindrical shape and hold it together. On the one hand, they thereby limit the axial mobility of tooth segments 1, and, on the other hand, they prevent the tooth segments from radially moving away from pegs 6. For the pegs are inserted in holes 2.

FIG. 3 shows the stator having retaining elements 5 slid on.

In other exemplary embodiments of the present invention, a differently shaped element provided with additional functions may be used in place of retaining element 5 designed as a ring having pegs. The element may also be executed as a cap, for example. Furthermore, it may also be executed as having electrical connections integrated into the retaining element. Particularly advantageous for this purpose is a design having a stamped grid that is extrusion-coated with plastic and is thus produced as a retaining element. The stamped grid is designed such that the wiring is producible by stamping the retaining element. For this purpose, various regions are respectively stamped out of the retaining element and thus the remaining stamped grid is designed for wiring.

What is claimed is:

1. An electric motor, comprising:
   a stator including stamp-packed tooth segments, which are slid together radially; and
   retaining element slid axially onto the tooth segments and holding together the tooth segments;
   wherein the tooth segments have groove and tongue for a form-locking interconnection in a circumferential direction; and
   wherein insulating paper surrounds windings of individual tooth segments.

2. The electric motor according to claim 1, wherein the retaining elements are connected to the tooth elements in a form-locking manner.

3. The electric motor according to claim 1, wherein the retaining elements are inserted by pegs into holes of the tooth segments.

4. The electric motor according to claim 3, wherein the pegs are oriented in an axial direction.

5. The electric motor according to claim 1, wherein the retaining elements include electrical connections to provide an interconnection of the windings of the individual tooth segments.

6. The electric motor according to claim 1, wherein the retaining elements include electric connections to provide at least one of (a) a parallel and (b) a series interconnection of the windings of the individual tooth segments.

7. The electric motor according to claim 1, wherein the retaining elements have a stamped grid extrusion-coated with plastic.

8. The electric motor according to claim 1, wherein each tooth segment includes an axially slid-on end cap.

9. The electric motor according to claim 1, wherein each tooth segment includes an axial slid-on end cap having grooves for running wires.

10. The electric motor according to claim 1, wherein the stator is insertable as a pre-completed stator pack into at least two different housing systems.

11. The electric motor according to claim 1, wherein the stator is insertable as a pre-completed stator pack into at least two different housing systems to achieve a high variance within a series of electric motors using as few parts as possible.

12. The electric motor according to claim 1, wherein the electric motor is configured to be manufactured by radially sliding together the tooth segments; and subsequently axially sliding retaining elements onto the tooth segments to hold together the tooth segments.

13. A method for manufacturing an electric motor as cited in claim 1, the motor including a stator having stamp-packed tooth segments, comprising:
   radially sliding together the tooth segments; and
   subsequently axially sliding retaining elements onto the tooth segments to hold together the tooth segments.

14. The electric motor according to claim 1, wherein the tooth segments are held together by only the retaining element.

15. A method for manufacturing an electric motor including a stator having stamp-packed tooth segments, comprising:
   radially sliding together the tooth segments; and
   subsequently axially sliding retaining elements onto the tooth segments to hold together the tooth segments;
   wherein the tooth segments have groove and tongue for a form-locking interconnection in a circumferential direction; and
   wherein insulating paper surrounds windings of individual tooth segments.

16. The method according to claim 15, wherein the tooth segments are held together by only the retaining element.

* * * * *